United States Patent
Reagan et al.

(10) Patent No.: US 10,134,191 B2
(45) Date of Patent: Nov. 20, 2018

(54) SYSTEMS AND METHODS FOR GENERATING A VIRTUAL SPACE BASED ON A PHYSICAL LAYOUT OF OBJECTS

(71) Applicant: DISNEY ENTERPRISES, INC., Burbank, CA (US)

(72) Inventors: Richard Reagan, Burbank, CA (US); Sagar Mistry, Burbank, CA (US); Nathan Allison, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 144 days.

(21) Appl. No.: 15/213,206

(22) Filed: Jul. 18, 2016

(65) Prior Publication Data

US 2018/0018821 A1    Jan. 18, 2018

(51) Int. Cl.
| | | |
|---|---|---|
| *G06T 19/00* | (2011.01) | |
| *H04N 5/232* | (2006.01) | |
| *A63F 13/213* | (2014.01) | |
| *A63F 13/25* | (2014.01) | |

(52) U.S. Cl.
CPC .......... *G06T 19/006* (2013.01); *A63F 13/213* (2014.09); *A63F 13/25* (2014.09); *H04N 5/23229* (2013.01); *A63F 2300/1093* (2013.01)

(58) Field of Classification Search
None
See application file for complete search history.

(56) References Cited

U.S. PATENT DOCUMENTS

| | | |
|---|---|---|
| 7,661,592 B1 | 2/2010 | Chisholm |
| 7,690,975 B2 | 4/2010 | Watanabe |
| 8,358,320 B2 | 1/2013 | Zhou |

(Continued)

FOREIGN PATENT DOCUMENTS

| | | |
|---|---|---|
| WO | 199604968 | 2/1996 |
| WO | 2007119912 A1 | 10/2007 |

OTHER PUBLICATIONS

Aronson, Phil, "Is Augmented Reality the Future of 3DS Gaming?", printed from URL: http://videogamewriters.com/is-augmented-reality-the-future-of-3ds-gaming-11331, May 24, 2011, 4 pages.

(Continued)

*Primary Examiner* — Edward Martello
(74) *Attorney, Agent, or Firm* — Sheppard Mullin Richter & Hampton LLP (57) ABSTRACT

This disclosure relates to generating a virtual space based on a physical layout of objects. The virtual space may be generated based on the physical layout of objects by one or more of identifying physical objects in a real-world space, determining a physical arrangement of the identified physical objects, determining virtual space content for the identified physical objects and the physical arrangement of the identified physical objects, executing an instance of the virtual space, and/or other operations. The virtual space may include the virtual space content determined based on individual virtual space content associated with the identified physical objects and the physical arrangement of the identified physical objects. The instance of the virtual space may be used to facilitate presentation of one or more views of the virtual space to a user and enable the user to interact with the virtual space.

20 Claims, 7 Drawing Sheets

(56) References Cited

U.S. PATENT DOCUMENTS

| | | |
|---|---|---|
| 8,764,571 B2 | 7/2014 | Sarmenta |
| 9,028,315 B2 * | 5/2015 | Morichau-Beauchant .................. A63F 3/00214 273/237 |
| 9,168,455 B2 | 10/2015 | Weisman |
| 9,354,716 B1 * | 5/2016 | Sharma ................ H04N 5/2252 |
| 2008/0139309 A1 | 6/2008 | Siegel |
| 2011/0304639 A1 | 12/2011 | Noge |
| 2011/0304640 A1 | 12/2011 | Noge |
| 2012/0092328 A1 | 4/2012 | Flaks |
| 2014/0002472 A1 | 1/2014 | Sobeski |
| 2015/0262427 A1 | 9/2015 | Kuranoshita |
| 2016/0033770 A1 | 2/2016 | Fujimaki |
| 2016/0364912 A1 | 12/2016 | Cho |

OTHER PUBLICATIONS

Grier, Jason, "Skylanders Announces Physical & Digital Battle Card Game: Skylanders Battlecast", printed from URL: http://www.skylandersinquirer.com/2015/08/18/skylanders-announces-physical-digital-battle-card-game-skylanders-battlecast/, Aug. 18, 2015, 9 pages.

TheGreen, "Zelda Augmented Reality Card", printed from URL: http://www.zeldadungeon.net/2011/02/zelda-augmented-reality-card/, Feb. 19, 2011, 7 pages.

Kato et al., "Marker Tracking and HMO Calibration for a Video-based Augmented Reality Conferencing System", IEEE, Aug. 6, 2002, pp. 1-10.

Kato. et al., "Virtual Object Manipulation on a Table-Top AR Environment", IEEE, Dec. 2000, 111-119.

* cited by examiner

FIG. 1

FIG. 2 stairs card 31 arena card 32 door card 33 hallway card 34

SYSTEMS AND METHODS FOR GENERATING A VIRTUAL SPACE BASED ON A PHYSICAL LAYOUT OF OBJECTS

FIELD

This disclosure relates to systems and methods for generating a virtual space based on a physical layout of objects.

BACKGROUND

Computing systems may generate a virtual space based on commands received from a controller, such as a game controller, a mouse, or a keyboard. Such computing systems do not provide for generation of a virtual space based on a physical layout of objects.

SUMMARY

This disclosure relates to generating a virtual space based on a physical layout of objects. The virtual space may be generated based on the physical layout of objects by one or more of identifying physical objects in a real-world space, determining a physical arrangement of the identified physical objects, determining virtual space content for the identified physical objects and the physical arrangement of the identified physical objects, executing an instance of the virtual space, and/or other operations. The virtual space may include the virtual space content determined based on individual virtual space content associated with the identified physical objects, the physical arrangement of the identified physical objects, and/or other information. The instance of the virtual space may be used to facilitate presentation of one or more views of the virtual space to a user and/or enable the user to interact with the virtual space.

A system for generating a virtual space based on a physical layout of objects may include one or more physical processors, and/or other components. In some implementations, the system may include an image sensor and/or other components. In some implementations, the image sensor, the one or more physical processors, and/or other components may be carried on a display. The field of view of the image sensor may be a function of the position and/or the orientation of the display, and/or other information.

The image sensor may be configured to generate visual output signals conveying visual information within a field of view of the image sensor. Visual information may represent a real-world space within the field of view of the image sensor. The image sensor may include one or more of a charge-coupled device sensor, an active pixel sensor, a complementary metal-oxide semiconductor sensor, an N-type metal-oxide-semiconductor sensor, and/or other image sensors. In some implementations, the image sensor may be part of a mobile device.

The display may be configured to present one or more views of the virtual space and/or other information. In some implementations, the display may include one or more of a monitor, a head-mounted display, an optical head-mounted display, a see-through display, an optical see-through display, a video see-through display, a visor, eyeglasses, sunglasses, a smartphone, a tablet, a mobile device, a projector, and/or other displays. In some implementations, the display may include an augmented reality display and/or a non-augmented reality display.

In some implementations, the display may be part of a mobile device. In some implementations, the display may be part of a computing device. The computing device may be separate and distinct from the mobile device. In some implementations, the mobile device and the computing device may be connected via a network. In some implementations, the mobile device and the computing device may communicate with each other through hard-wired communication, wireless communication, or both.

The one or more physical processors may be configured by machine-readable instructions. Executing the machine-readable instructions may cause the one or more physical processors to facilitate generating a virtual space based on a physical layout of objects. The machine-readable instructions may include one or more computer program components. The computer program components may include one or more of a visual information component, an identification component, a physical arrangement component, a virtual space content component, a virtual space component, and/or other computer program components.

The visual information component may be configured to obtain visual information that represents a real-world space within a field-of-view of an image sensor. The visual information may represent the real-world space at a time, over a period of time, at a location, and/or over a range of locations. The real-world space may include a set of physical objects and/or other objects. The set of physical objects may include a first physical object, a second physical object, and/or other physical objects that are separate, discrete, and/or unattached from each other. In some implementations, individual ones of the first physical object, the second physical object, and/or other physical objects may include a card and/or other physical objects.

Individual physical objects may be associated with virtual space content. The first physical object may be associated with first virtual space content and/or other virtual space content. The second physical object may be associated with second virtual space content and/or other virtual space content. Other physical objects may be associated with other virtual space content. Virtual space content may include one or more a virtual object, a game mechanic, and/or other virtual space content. A virtual object may refer to an entity within a virtual space. A virtual object may include one or more entities that may be observed visually and/or form a topology within a virtual space. A game mechanic may refer to a rule applied within a virtual space. A game mechanic may define one or more of a relationship between virtual objects within a virtual space, how one or more users may interact with a virtual space and/or virtual objects within a virtual space, and/or other information.

In some implementations, the first virtual space content may include a first virtual object and/or other virtual objects, and the second virtual space content may include a second virtual object and/or other virtual objects. In some implementations, the first virtual object and/or the second virtual object may include one or more of a virtual floor, a virtual wall, a virtual ceiling, a virtual door, a virtual window, a virtual stair, a virtual room, a virtual hall, a virtual structure, a virtual character, a virtual trap, a virtual tool, a virtual furniture, a virtual item, a virtual effect, and/or other virtual objects.

In some implementations, the first virtual space content may include a first virtual object and/or other virtual objects, and the second virtual space content may include a first game mechanic and/or other game mechanics. In some implementations, the first virtual space content and/or the second virtual space content may include one or more virtual objects and/or one or more game mechanics.

In some implementations, a combination of the first physical object, the second virtual object, and/or other virtual objects and the first physical arrangement of first physical object, the second virtual object, and/or other virtual objects may be associated with third virtual space content, and/or other virtual space content.

The identification component may be configured to identify individual ones of the physical objects in the set of physical objects. The individual ones of the physical objects may be identified from the visual information. When a physical object is within the visual information, the identification component may be configured to identify the physical object. In some implementations, the identification of individual ones of the physical objects in the set of physical objects may include determining one or more of shapes of the physical objects, shapes of parts of the physical objects, images on the physical objects, markings or other indicia on the physical objects, and/or other identifying features.

The physical arrangement component may be configured to determine one or more physical arrangements of the identified physical objects. One or more physical arrangements of the identified physical objects may be determined from the visual information. When the identified physical objects are within the visual information, the physical arrangement component may be configured to determine one or more arrangements of the identified physical objects. Determination of one or more physical arrangements of the identified physical objects may include determining a first physical arrangement of the first physical object, the second physical object, and/or other objects, and/or other physical arrangements of the identified physical objects.

In some implementations, one or more physical arrangements of the identified physical objects may include relative positions and/or orientations of the identified physical objects. A first physical arrangement of the first physical object, the second physical object, and/or other objects may include a relative position and/or orientation of the first physical object, the second physical object, and/or other objects.

The virtual space content component may be configured to determine virtual space content for the identified physical objects and the physical arrangement(s) of the identified physical objects. Such determination may be based on individual virtual space content associated with the individual identified physical objects and the physical arrangement(s) of the identified physical objects so that the virtual space content for the identified physical objects and the physical arrangement(s) of the identified physical objects is determined based on the first virtual space content, the second virtual space content, and/or other virtual space content, and the first physical arrangement of the first physical object, the second physical object, and/or other objects.

The virtual space component may be configured to execute an instance of the virtual space. The virtual space may include one or more of a two-dimensional space, a three-dimensional space, and/or other virtual space. The instance of the virtual space may include the virtual space content determined based on the individual virtual space content associated with the individual identified physical objects and the physical arrangement(s) of the identified physical objects, and/or other information. The virtual space component may use the instance of the virtual space to facilitate presentation of one or more views of the virtual space to a user. The virtual space component may use the instance of the virtual space to enable a user to interact with the virtual space.

In some implementations, the virtual space content included in the instance of the virtual space may include the first virtual object, the second virtual object, and/or other virtual objects positioned within the virtual space based on the first physical arrangement of the first physical object, the second physical object, and/or other objects.

In some implementations, the virtual space content included in the instance of the virtual space may include the first game mechanic and/or other game mechanics applied to the first virtual object and/or other objects based on the first physical arrangement of the first physical object, the second physical object, and/or other objects. In some implementations, the virtual space content included in the instance of the virtual space may include a third virtual space content and/or other virtual space content.

In some implementations, the execution of the instance of the virtual space may include the virtual space component executing an instance of a game within the virtual space. The virtual space component may be configured determine whether one or more users successfully complete the game. The virtual space component may be configured to provide a reward based on whether one or more users successfully complete the game.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
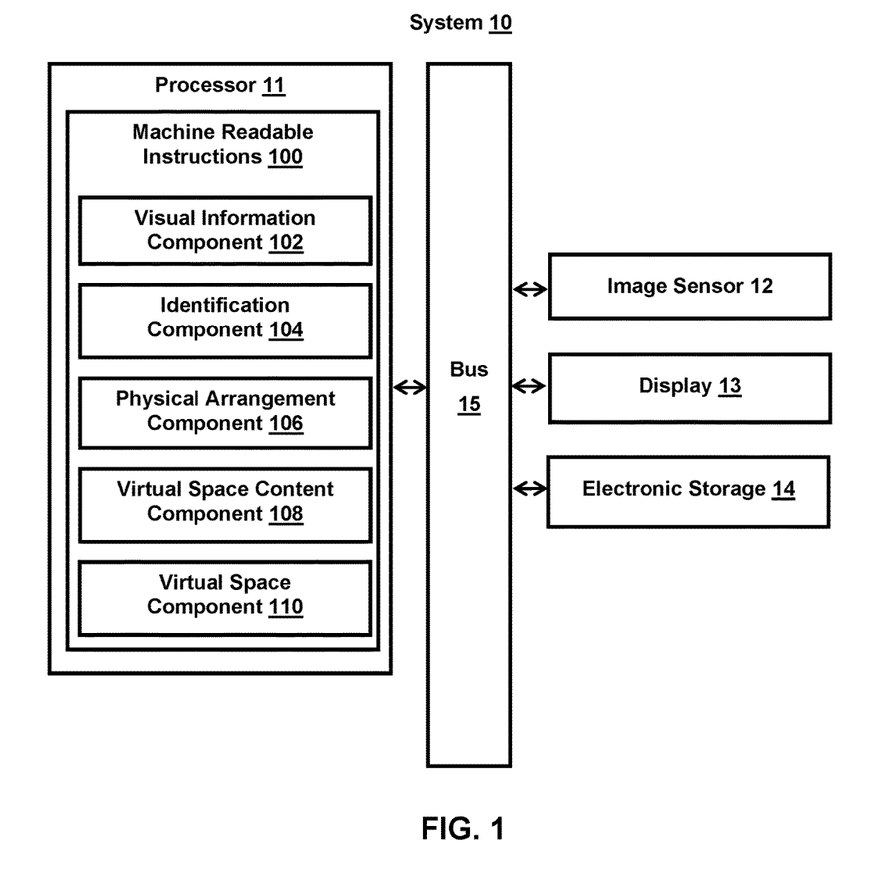
FIG. 1 illustrates a system for providing augmented reality experience based on a relative position of objects.

FIG. 1 illustrates a system 10 for generating a virtual space based on a physical layout of objects. System 10 may include one or more of processor 11, image sensor 12, display 13, electronic storage 14, bus 15, and/or other components. To generate a virtual space based on a physical layout of objects, physical objects in a real-world space may be identified. A physical arrangement of the identified physical objects may be determined. Virtual space content for the identified physical objects and the physical arrangement of the identified physical objects may be determined. An instance of the virtual space may be executed. The virtual space may include the virtual space content determined based on individual virtual space content associated with the identified physical objects and the physical arrangement of the identified physical objects, and/or other information. The instance of the virtual space may be used to facilitate presentation of one or more views of the virtual space to a user and/or enable the user to interact with the virtual space.

Image sensor 12 may be configured to generate visual output signals conveying visual information within the field of view of image sensor 12. Visual information may represent a real-world space within the field of view of image sensor 12. Visual information may include one or more of an image, a video, and/or other visual information. When a physical object is within the field of view of image sensor 12, visual information may include one or more of an image, a video, and/or other visual information regarding the physical object. Image sensor 12 may include one or more of a charge-coupled device sensor, an active pixel sensor, a complementary metal-oxide semiconductor sensor, an N-type metal-oxide-semiconductor sensor, and/or other image sensors. In some implementations, image sensor 12 may be part of a mobile device. For example, image sensor 12 may include one or more image sensors on a mobile device (e.g., a smartphone, a smartwatch, a tablet, a mobile gaming console, a laptop, a camera, etc.).

Display 13 may be configured to present one or more views of the virtual space and/or other information. In some implementations, display 13 may include one or more screens on which one or more views of the virtual space and/or other information is presented. In some implementations, display 13 may include a platform including one or more screens and other components (e.g., processor(s), input/output, memory, etc.) In some implementations, display 13 may include one or more of a monitor, head-mounted display, an optical head-mounted display, a see-through display, an optical see-through display, a video see-through display, a visor, eyeglasses, sunglasses, a smartphone, a tablet, a mobile device, a projector, and/or other displays. In some implementations, display 13 may include one or more of an augmented reality display and/or a non-augmented reality display. In some implementations, processor 11, image sensor 12, and/or other components may be carried on display 13. In some implementations, the field of view of image sensor 12 may be a function of the position and/or the orientation of display 13, and/or other information.

In some implementations, display 13 may be part of a mobile device. For example, display 13 may include one or more display on a mobile device (e.g., a smartphone, a smartwatch, a tablet, a mobile gaming console, a laptop, a camera, etc.). In some implementations, display 13 may be part of a computing device. The computing device may be separate and distinct from a mobile device. For example, image sensor 12 may be part of a mobile device and display 13 may be part of a computing device (e.g., gaming console, etc.) that is separate and distinct from the mobile device. In some implementations, the mobile device and the computing device may be connected via a network. The mobile device and the computing device may communicate with each other through hard-wired communication, wireless communication, or both. By way of non-limiting example, wireless communication may include one or more of radio communication, Bluetooth communication, Wi-Fi communication, cellular communication, infrared communication, or other wireless communication. Other types of communications are contemplated by the present disclosure.

Electronic storage 14 may include electronic storage media that electronically stores information. Electronic storage 14 may store software algorithms, information determined by processor 11, information received remotely, and/or other information that enables system 10 to function properly. For example, electronic storage 14 may store visual information (as discussed elsewhere herein), information relating to one or more physical objects, one or more virtual space content, one or more virtual objects, one or more game mechanics, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate generating a virtual space based on a physical layout of objects. Machine readable instructions 100 may include one or more of visual information component 102, identification component 104, physical arrangement component 106, virtual space content component 108, virtual space component 110, and/or other computer program components.

Visual information component 102 may be configured to obtain visual information that represents a real-world space within a field-of-view of image sensor 12. The visual information may represent the real-world space at a time, over a period of time, at a location, and/or over a range of locations. For example, the visual information may include an image that represents the real-world space at a time and/or at a location. As another example, the visual information may include multiple images that represent the real-world space at a time (e.g., multiple images represent the real-world space at different locations at the same time, multiple images represent the real-world space at the same or different locations from different perspectives at the same time, etc.). As another example, the visual information may include multiple images that represent the real-world space at a location (e.g., multiple images represent the real-world space at the same location at different times, multiple images represent the real-world space at the same location from different perspectives, etc.).

A real-world space may include a set of physical objects and/or other objects. A physical object may refer to a physical entity that may be detectable by image sensor 12. A physical object may be two-dimensional or three-dimensional. As a non-limiting example, a physical object may include one or more of a card, a paper, a book, a package, a figurine, a toy, a tool, and/or other objects. A set of physical objects may include a first physical object, a second physical object, and/or other physical objects that are separate, discrete, and/or unattached from each other. In some implementations, the first physical object, the second physical object, and/or other physical objects may include a card and/or other physical objects.

One or more physical objects may be associated with one or more virtual space content. Virtual space content may refer to an entity and/or a rule that may be implemented within a virtual space. Virtual space content may be static or dynamic. Virtual space content may be present within a virtual space at a time, over a period of time, at a location, and/or over a range of locations. For example, virtual space content may include one or more of a virtual object, a game mechanic, and/or other virtual space content. The association of one of more physical objects to one or more virtual space content may be static or dynamic. For example, a particular physical object may be associated with a particular virtual space object and the association may not be changed. As another example, a particular physical object may be associated with a particular virtual space object and the association may be changed. As another example, a particular physical object may not be associated with any particular virtual space object and an associate with a particular virtual space object may be made.

A virtual object may refer to an entity within a virtual space. A virtual object may include one or more entities that may be observed visually and/or form a topology within a virtual space. As a non-limiting example, a virtual object may include one or more of a virtual floor, a virtual wall, a virtual ceiling, a virtual door, a virtual window, a virtual stair, a virtual room, a virtual hall, a virtual structure, a virtual character, a virtual trap, a virtual tool, a virtual furniture, a virtual item, a virtual effect, and/or other virtual objects.

A game mechanic may refer to a rule applied within a virtual space. A game mechanic may define one or more of a relationship between virtual objects within a virtual space, how one or more users may interact with a virtual space and/or virtual objects within a virtual space, and/or other information. As a non-limiting example, a game mechanic may include one or more of a game rule, a goal, a game reward, a victory condition, a defeat condition, an effects multiplier, a type of gameplay, and/or other game mechanics.

The first physical object may be associated with first virtual space content and/or other virtual space content. The second physical object may be associated with second virtual space content and/or other virtual space content. Other physical objects may be associated with other virtual space content. In some implementations, the first virtual space content may include a first virtual object and/or other virtual objects, and the second virtual space content may include a second virtual object and/or other virtual objects. For example, the first virtual space content may include a virtual hall and/or other virtual objects, and the second virtual space content may include a virtual character and/or other virtual objects.

In some implementations, the first virtual space content may include a first virtual object and/or other virtual objects, and the second virtual space content may include a first game mechanic and/or other game mechanics. For example, the first virtual space content may include a virtual hall with a virtual character and/or other virtual objects, and the second virtual space content may include a victory condition and/or other game mechanics.

In some implementations, the first virtual space content and/or the second virtual space content may include one or more virtual objects and/or one or more game mechanics. For example, the first virtual space content may include a virtual arena with a virtual trap, an effects multiplier, other virtual objects, and/or other game mechanics. As another example, the second virtual space content may include a virtual dungeon with a number of virtual characters, a victory condition, a defeat condition, other virtual objects, and/or other game mechanics.

Figure 3:
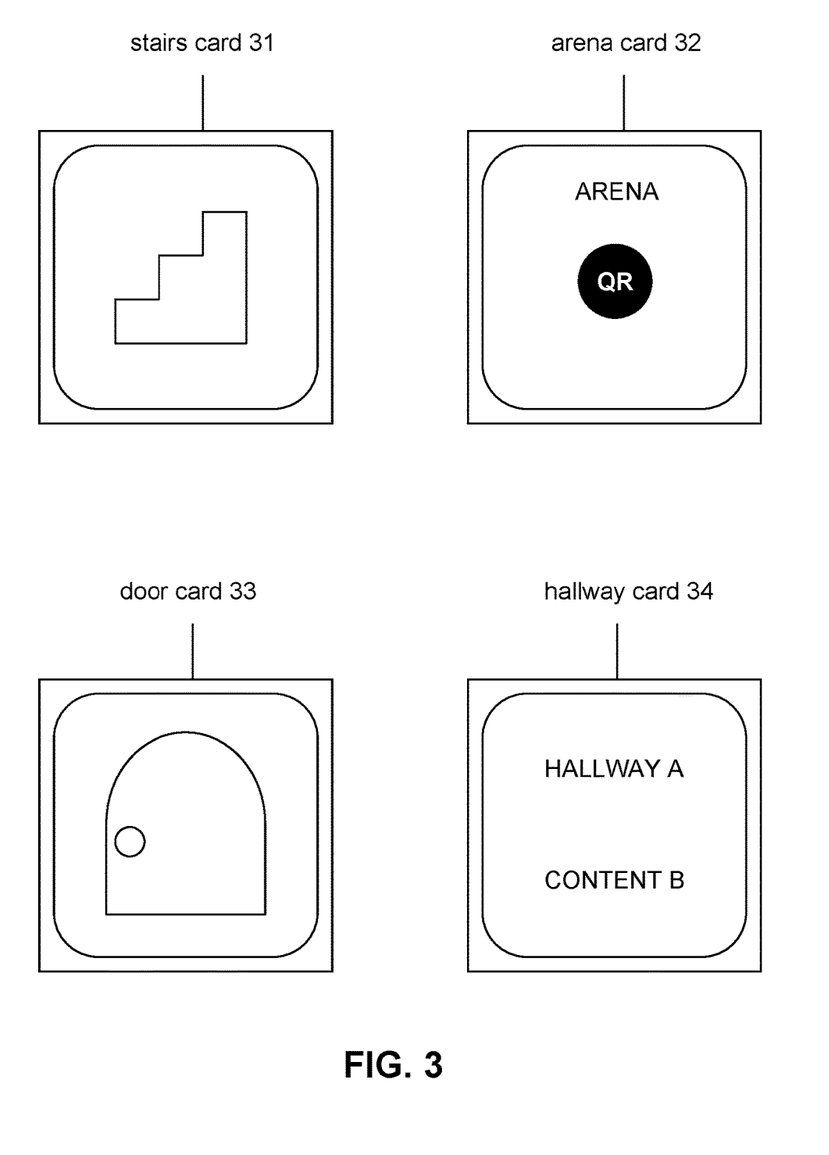
FIGS. 3-4 illustrate examples of cards.
Figure 4:
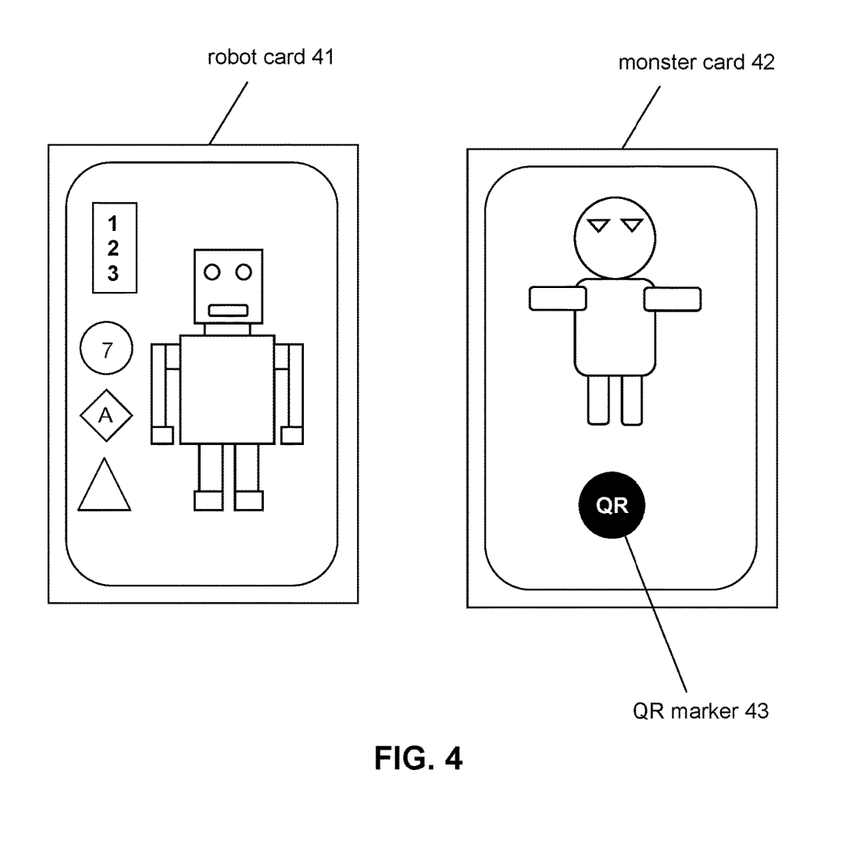

FIGS. 3-4 illustrate non-limiting examples of cards associated with virtual space content. Cards may include one or more views of one or more virtual objects and/or one or more game mechanic, one or more markings relating to one or more virtual objects and/or one or more game mechanic, one or more indicia relating to one or more virtual objects and/or one or more game mechanic, other identifying features, and/or other information relating to one or more virtual objects and/or one or more game mechanic. For example, a card may include a perspective and/or other views of a virtual character. As another example, a card may include text describing a game mechanic. As another example, a card may include a marker (e.g., a sticker, a label, a barcode, a quick response (QR) code, a character, a shape, etc.) including information relating to a virtual object and/or a game mechanic. Cards may be of the same size or may be of different sizes.

As a non-limiting example, FIG. 3 illustrates stairs card 31, arena card 32, door card 33, and hallway card 34. Stairs card 31 may include a view of stairs and/or other information. Stairs card 31 may include information about the stairs, virtual objects on the stairs, and/or game mechanics relating to stairs. Arena card 32 may include a text of an arena, a QR code, and/or other information. The text and/or the QR code may provide information relating to the arena, virtual objects within the arena, game mechanics within the arena, and/or other information. Arena card 32 may include information relating to the arena, virtual objects within the arena, game mechanics within the arena, and/or other information. Door card 33 may include a view of a door and/or other information. Door card 33 may include information about the door, virtual objects relating to the door, game mechanics relating to the door, and/or other information. Hallway card 34 may include a text of a hallway, a text of virtual objects within the hallway, and/or other information. The text of the hallway and/or the text of virtual objects within the hallway may include information relating to the hallway, virtual objects within the hallway, game mechanics within the hallway, and/or other information. Hallway card 34 may include information relating to the hallway, the virtual objects within the hallway, game mechanics within the hallway, and/or other information.

As a non-limiting example, FIG. 4 illustrates robot card 41 and monster card 42. Robot card 41 may include a view of a robot, and monster card 42 may include a view of a monster. The view of the robot and/or the monster may include one or more of a frontal view, a back view, a side view, a top view, a bottom view, a perspective view, a partial view, a full view, and/or other views. Robot card 41 and monster card 42 may include information about one or more virtual objects and/or one or more game mechanic. For example, robot card 41 may include shapes and characters on the left side that provide information about the robot and/or game mechanics relating to the robot. Monster card 42 may include QR marker 43 that provide information about the monster and/or game mechanics relating to the monster. Other appearances and configurations of cards are contemplated.

In some implementations, a combination of the first physical object, the second virtual object, and/or other virtual objects and the first physical arrangement of first physical object, the second virtual object, and/or other virtual objects may be associated with third virtual space content, and/or other virtual space content. For example, the first physical object may be associated with a first virtual object (e.g., monster wolf, etc.) and/or a first game mechanic (e.g., a goal of winning within five minutes, etc.), and the second physical object may be associated with a second virtual object (e.g., a robot, etc.) and/or a second game mechanic (e.g., an action-type gameplay). A specific physical arrangement of the first physical object and the second physical object (e.g., the first physical object positioned and/or oriented with respect to the second physical object in a certain way) may be associated with a third virtual space content (e.g., a wolf robot, a goal of winning within five minutes in an action-type gameplay, etc.), and/or other virtual space content.

Figure 5A:
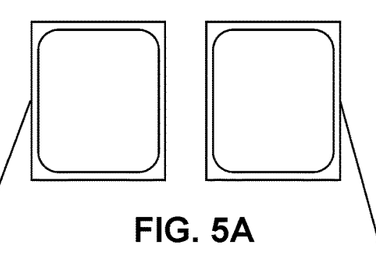
FIGS. 5A-5C illustrates exemplary layouts of cards.
Figure 5B:
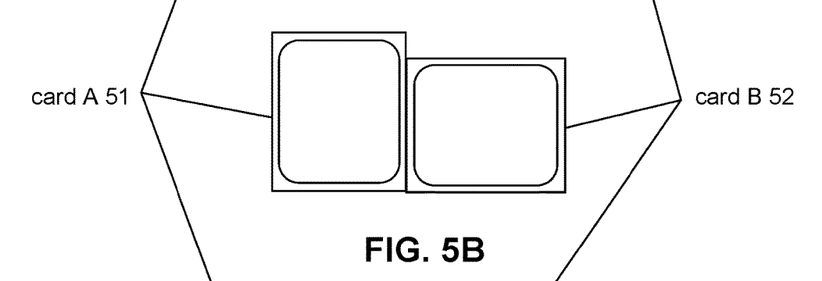
Figure 5C:
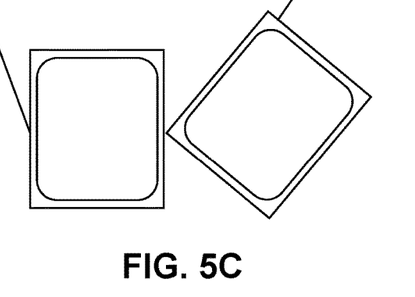

For example, FIGS. 5A-5C illustrates exemplary layouts of cards. Card A 51 may be associated with a monster wolf and card B 52 may be associated with a robot. The physical arrangement of card A 51 and card B 52 in FIG. 5A, may be associated with the monster wolf and the robot positioned next to each other in a virtual space. The combination of card A 51 and card B 52 and the physical arrangement of card A 51 and card B 52 in FIG. 5B may be associated with a wolf robot in a virtual space. The combination of card A 51 and card B 52 and the physical arrangement of card A 51 and card B 52 in FIG. 5C may be associated with a wolf-robot in a virtual space, where the amount of wolf and the amount of robot in the wolf-robot is determined by the orientation of card B 52 with respect to card A 51 and/or the position at which card B 52 touches card A 51. Other objects, associations of virtual space content, and layouts of cards are contemplated.

In some implementations, one or more physical objects may be characterized by a certain source (e.g., brand, etc.) and/or a certain theme. A combination of physical objects of the same source and/or theme may result in different virtual space content. For example, physical objects associated with virtual objects and/or game mechanics may be characterized by the same theme and/or brand. A combination of such physical objects may be result in different virtual objects (e.g., a combination of physical objects associated with regular soldiers may result in a group of elite soldiers, etc.), the same virtual objects with different game mechanic (e.g., a combination of physical objects associated with enemies may result in a group of enemies with higher abilities, etc.), different game mechanics (e.g., a combination of physical objects associated with double effects multiplier may result in triple effects multiplier, etc.), and/or other virtual space content.

Identification component 104 may be configured to identify individual ones of the physical objects in the set of physical objects. The individual ones of the physical objects may be identified from the visual information. When a physical object is within the visual information, identification component 104 may be configured to identify the physical object. In some implementations, the identification of individual ones of the physical objects in the set of physical objects may include determining one or more of shapes of the physical objects, shapes of parts of the physical objects, images on the physical objects, markings, indicia, and/or other identifying features on the physical objects.

Figure 6:
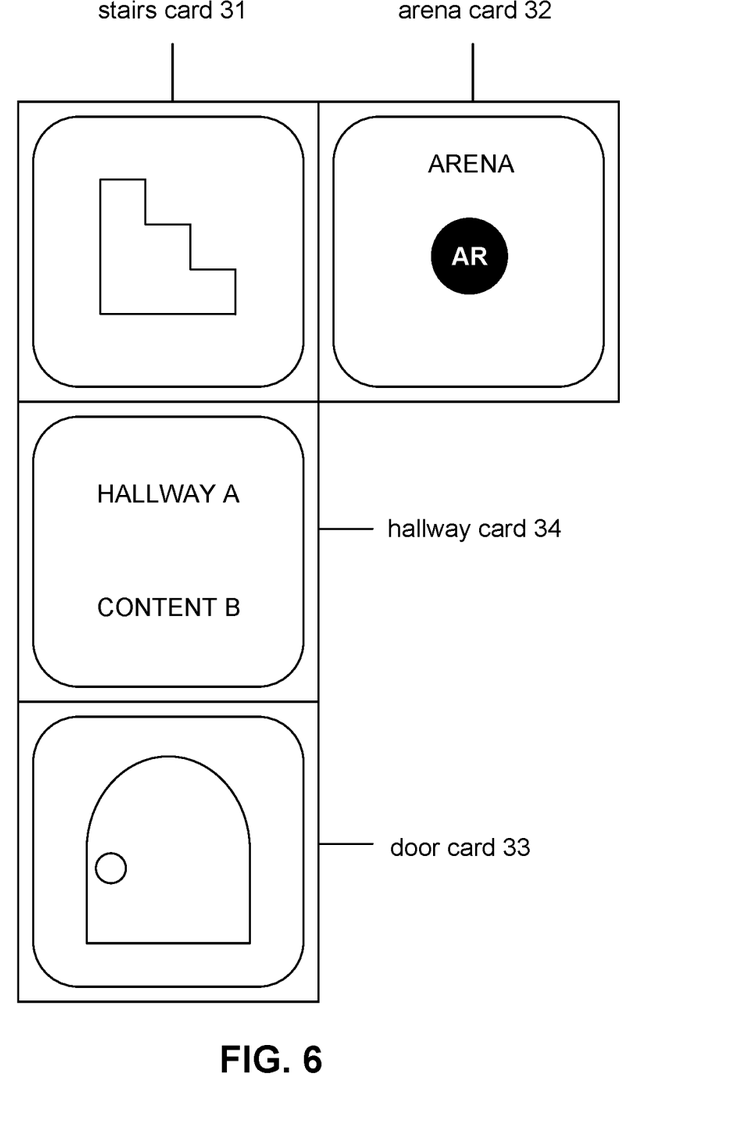
FIG. 6 illustrates an exemplary layout of objects.
Figure 7:
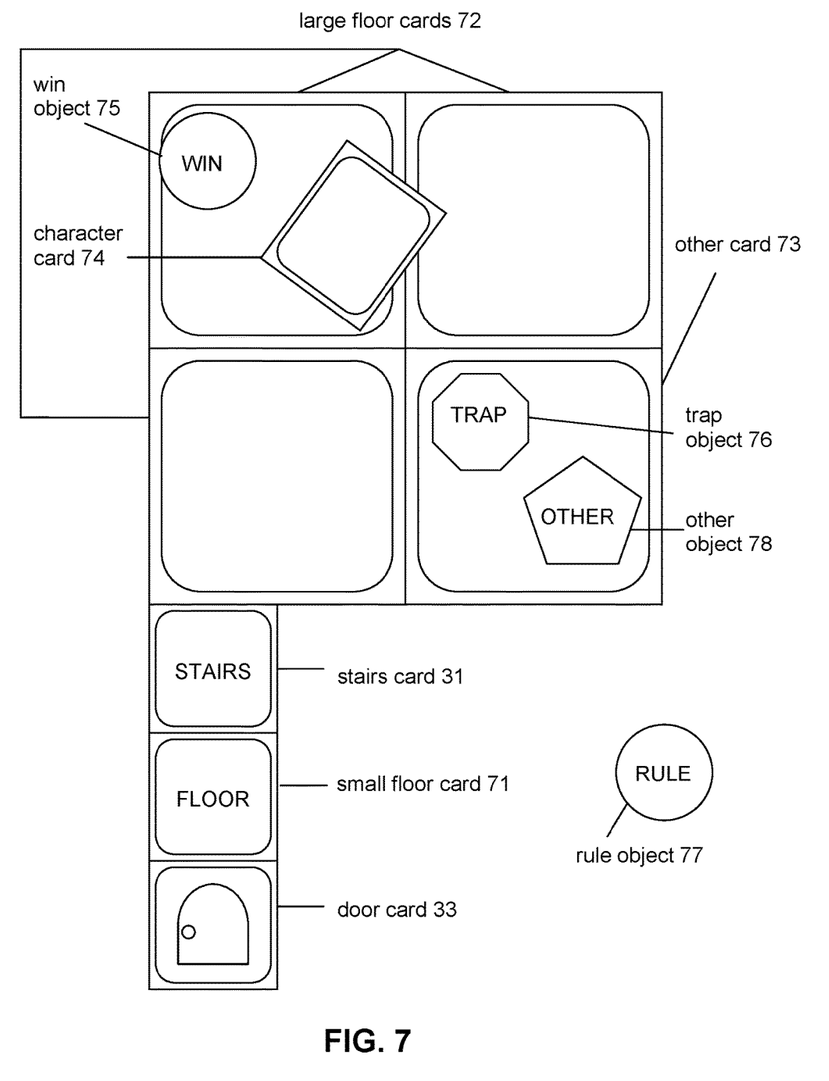
FIG. 7 illustrate an exemplary layout of objects.

For example, FIGS. 6 and 7 illustrate non-limiting examples of physical objects identified by identification component 104. In FIG. 6, stairs card 31, arena card 32, door card 33, hallway card 34, and/or other physical objects may be within the visual information. Identification component 104 may identify one or more of stairs card 31, arena card 32, door card 33, hallway card 34, and/or other physical objects from the visual information. Identification component 104 may determine one or more of shapes of stairs card 31, arena card 32, door card 33, hallway card 34, and/or other physical objects, shapes of parts of stairs card 31, arena card 32, door card 33, hallway card 34, and/or other physical objects, images on stairs card 31, arena card 32, door card 33, hallway card 34, and/or other physical objects, markings on stairs card 31, arena card 32, door card 33, hallway card 34, and/or other physical objects, indicia on stairs card 31, arena card 32, door card 33, hallway card 34, and/or other physical objects, and/or other identifying features on stairs card 31, arena card 32, door card 33, hallway card 34, and/or other physical objects.

In FIG. 7, stairs card 31, door card 33, small floor card 71, large floor cards 72, other card 73, character card 74, win object 75, trap object 76, rule object 77, other object 78, and/or other physical objects may be within the visual information. Identification component 104 may identify one or more of stairs card 31, door card 33, small floor card 71, large floor cards 72, other card 73, character card 74, win object 75, trap object 76, rule object 77, other object 78, and/or other physical objects from the visual information. Identification component 104 may determine one or more of shapes of stairs card 31, door card 33, small floor card 71, large floor cards 72, other card 73, character card 74, win object 75, trap object 76, rule object 77, other object 78, and/or other physical objects, shapes of parts of stairs card 31, door card 33, small floor card 71, large floor cards 72, other card 73, character card 74, win object 75, trap object 76, rule object 77, other object 78, and/or other physical objects, images on stairs card 31, door card 33, small floor card 71, large floor cards 72, other card 73, character card 74, win object 75, trap object 76, rule object 77, other object 78, and/or other physical objects, markings on stairs card 31, door card 33, small floor card 71, large floor cards 72, other card 73, character card 74, win object 75, trap object 76, rule object 77, other object 78, and/or other physical objects, indicia on stairs card 31, door card 33, small floor card 71, large floor cards 72, other card 73, character card 74, win object 75, trap object 76, rule object 77, other object 78, and/or other physical objects, and/or other identifying features on stairs card 31, arena card 32, door card 33, hallway card 34, and/or other physical objects.

Physical arrangement component 106 may be configured to determine one or more physical arrangements of one or more identified physical objects. One or more physical arrangements of one or more identified physical objects may be determined from the visual information. When the identified physical objects are within the visual information, physical arrangement component 106 may be configured to determine the arrangement(s) of the identified physical objects. Determination of the physical arrangement(s) of the identified physical objects may include determining a first physical arrangement of the first physical object, the second physical object, and/or other objects. For example, physical arrangement component 106 may determine one or more physical arrangements of stairs card 31, arena card 32, door card 33, hallway card 34 (as shown in FIG. 6), and/or other physical objects from the visual information. As another example, physical arrangement component 106 may determine one or more physical arrangements of stairs card 31, door card 33, small floor card 71, large floor cards 72, other card 73, character card 74, win object 75, trap object 76, rule object 77, other object 78 (As shown in FIG. 7), and/or other physical objects from the visual information.

In some implementations, one or more physical arrangements of one more identified physical objects may include relative positions and/or orientations of one or more identified physical objects. For example, a first physical arrangement of a first physical object, a second physical object, and/or other objects may include a relative position and/or orientation of the first physical object, the second physical object, and/or other objects. For example, physical arrangement component 106 may determine a physical arrangement of physical objects shown in FIG. 6 that includes information relating to relative positions and/or orientations of stairs card 31, arena card 32, door card 33, hallway card 34, and/or other physical objects. For example, physical arrangement component 106 may determine that stairs card 31 is oriented so that the stairs shown in stairs card 31 is descending from right to left. As another example, physical arrangement component 106 may determine that the stairs card 31, arena card 32, door card 33, and hallway card 34 are positioned and oriented to form a half bracket shape. Other positions and/or orientations of physical objects are contemplated.

Virtual space content component 108 may be configured to determine virtual space content for the identified physical objects and the physical arrangement(s) of the identified physical objects. Such determination may be based on the individual virtual space content associated with the individual identified physical objects and the physical arrangement(s) of the identified physical objects so that the virtual space content for the identified physical objects and the physical arrangement of the identified physical objects is determined based on the first virtual space content, the second virtual space content, and/or other virtual space content, and the first physical arrangement of the first physical object, the second physical object, and/or other objects. Virtual space content component 108 may include or retrieve information (for example, a database, a lookup table, etc.) that matches one or more identified physical object and/or the physical arrangement(s) of the one or more identified physical objects to a particular virtual space content.

In some implementations, virtual space content included in an instance of a virtual space may include a first virtual object, a second virtual object, and/or other virtual objects positioned within the virtual space based on a physical arrangement of a first physical object, a second physical object, and/or other objects. In some implementations, virtual space content included in an instance of a virtual space may include a first game mechanic and/or other game mechanics applied to a first virtual object and/or other objects based on a physical arrangement of a first physical object, a second physical object, and/or other objects.

For example, based on the physical objects and the physical arrangement of physical objects in FIG. 6, virtual space content component 108 may determine virtual space content that includes a virtual door (associated with door card 33) that opens into a virtual hallway (associated with hallway card 34). The virtual hallway may lead to virtual stairs that lead down (associated with the orientation of stairway card 31 in FIG. 6), which leads to a virtual arena (associated with arena card 32).

The dimensions of one or more of the virtual door, virtual hallway, virtual stairs, and virtual arena may be proportional to the sizes of cards 31, 32, 33, 34 (e.g., the dimensions of each virtual object matches the dimensions of other virtual objects based on cards 31, 32, 33, and 34 being of same size, etc.) or may not be proportional to the sizes of cards 31, 32, 33, 34 (e.g., the dimensions of the virtual arena may be larger than the dimensions of the virtual door even through arena card 32 and door card 33 are of the same size, etc.). One or more of the virtual door, the virtual hallway, the virtual stairs, and the virtual arena may include other virtual objects and/or one or more game mechanics.

As another example, based on the physical objects and the physical arrangement of physical objects in FIG. 7, virtual space content component 108 may determine virtual space content that includes a virtual door (associated with door card 33) that opens into a virtual small floored area (associated with small floor card 71), which leads to virtual stairs (associated with stairs card 31). The virtual stairs may lead to a virtual large floored area (associated with large floor cards 72), with the connection between the virtual stairs and the virtual large floored area being made at a corner of the large floored area. The virtual large floored area may be connected with another virtual area (associated with other card 73). The virtual space content may include a rule (associated with rule object 77). The virtual large floored area may include a virtual character (associated with character card 74) towards the back of the virtual large floored area, with the virtual character turned towards the virtual stairs. Condition(s) for a user to beat the virtual character may be defined by a win condition (associated with win object 75). The virtual large floored area may include other virtual object (associated with other object 78) and a virtual trap (associated with trap object 76) near the other virtual object.

The dimensions of one or more of the virtual door, virtual small floored area, virtual stairs, virtual large floored area, another virtual area, virtual character, other virtual object, and virtual trap may be proportional to the sizes of cards/objects 31, 33, 71, 72, 73, 74, 76, 78 or may not be proportional to the sizes of cards/objects 31, 33, 71, 72, 73, 74, 76, 78. One or more of the virtual door, virtual small floored area, virtual stairs, virtual large floored area, another virtual area, virtual character, other virtual object, and/or virtual trap may include other virtual objects and/or one or more game mechanics.

Virtual space component 108 may be configured to execute an instance of the virtual space. The virtual space may include one or more of a two-dimensional space, a three-dimensional space, and/or other virtual space. The instance of the virtual space may include the virtual space content determined based on the individual virtual space content associated with the individual identified physical objects and the physical arrangement of the identified physical objects, and/or other information. For example, virtual space component 108 may execute an instance of a virtual space including the virtual space content determined based on the virtual space content associated with the physical objects in FIG. 6 and the physical arrangement of the physical objects in FIG. 6, as described above. As another example, virtual space component 108 may execute an instance of a virtual space including the virtual space content determined based on the virtual space content associated with the physical objects in FIG. 7 and the physical arrangement of the physical objects in FIG. 7, as described above. Execution of instances of virtual space including other virtual space content are contemplated.

In some implementations, virtual space content included in an instance of the virtual space may include a third virtual space content and/or other virtual space content based on a combination of a first physical object, a second physical object, and/or other virtual objects and a physical arrangement of first physical object, the second virtual object, and/or other virtual objects. For example, card A 51 and card B 52 arranged as shown in FIG. 5B may be placed on top of large floor cards 72 in FIG. 7. The virtual space may include a virtual wolf robot (associate with combination and the physical arrangement of card A 51 and card B 52 shown in FIG. 5B) in the virtual large floored area.

Virtual space component 108 may use the instance of the virtual space to facilitate presentation of one or more views of the virtual space to one or more users. One or more views of the virtual space may be facilitated on one or more of an augmented reality display and/or a non-augmented reality display. Presentation of the virtual space on one or more augmented reality displays may be effectuated so that the virtual content appears to augments one or more physical objects. The execution of the instance of the virtual space by virtual space component 108 may include determining a virtual space state associated with the virtual space. Virtual space component 108 may use the game instance to generate virtual space state information that is transmitted to one or more displays 13. The virtual space state information may facilitate presentation of views of the virtual space to one or more users via one or more displays 13. The virtual space state information may include information defining the virtual space.

The virtual space state information determined and transmitted to display 13 may correspond to a view for a user character being controlled by a user. The state determined and transmitted to display 13 may correspond to a location in a virtual space associated with the user. The view described by the virtual space state information for a given display may correspond, for example, to the location from which the view is taken, the location the view depicts, and/or other locations, a zoom ratio, a dimensionality of objects, a point-of-view, and/or view parameters of the view. One or more of the view parameters may be selectable by the user.

Virtual space component 108 may use the instance of the virtual space to enable a user to interact with the virtual space and/or with other users. Virtual space component 108 may be configured to perform operations in the instance of the virtual space in response to commands received from a user (e.g., commands received from a game controller/console, etc.). Within the instance of the virtual space, one or more users may interact with elements in the virtual space and/or with each other.

In some implementations, the execution of the instance of the virtual space may include virtual space component 110 executing an instance of a game within the virtual space. The instance of the game may allow one or more users to interact with one or more virtual objects and/or each other within the virtual space. One or more user's interaction within the virtual space may be determined by one or more game mechanics. For example, an instance of a game may be executed within the virtual space including virtual space content determined based on the physical objects and the physical arrangement of physical objects in FIG. 7. The instance of the game allow one or more users to interact with one or more virtual objects (e.g., a virtual character associated with character card 74, etc.). One or more user's interaction within the virtual space (e.g., interaction with the virtual character, etc.) may be determined by a rule (associated with rule object 77) and/or a win condition (associated with win object 75).

Virtual space component 110 may be configured determine whether one or more users successfully complete the game. Success may be determined based on whether one or more users achieves one or more objectives for the game. For example, in the instance of the game executed within the virtual space described above, virtual space component 110 may determine whether one or more users defeats the virtual character (associated with character card 74) as required by the win condition (win object 75).

Virtual space component 110 may be configured to provide one or more rewards based on whether one or more users successfully complete the game. Virtual space component 110 may provide one or more rewards upon an achievement of one or more objectives, at the end of the instance of the game, and/or at other times. In some implementations, virtual space component 110 may track the number of times one or more users have successfully completed the game. Virtual space component 110 may provide different rewards based on the game completion success rate. For example, a successful completion of a game within a virtual space having a lower game completion success rate (indicating a more difficult game/virtual space, etc.) may lead to virtual space component 110 providing a better reward than a reward provided for a game within a virtual space having a higher game completion success rate (indicating an easier game/virtual space, etc.). In some implementations, virtual space component 110 may provide one or more rewards determined by a creator of the virtual space and/or determined to be part of the virtual space based on one or more physical objects associated with a game reward.

Virtual space component 110 may provide one or more rewards to one or more users of a virtual space and/or a creator of the virtual space. For example, virtual space component 110 may provide one or more rewards to a user who successfully completes a game within the virtual space. As another example, virtual space component 110 may provide one or more rewards to a user who created the virtual space based on one or more other users failing to successfully complete a game within the virtual space. For example, a user may create a virtual space and share the virtual space with other users. When one or more of the other users plays a game within the virtual space and are defeated within the game, virtual space component 110 may provide one or more rewards to the creator of the virtual space. As another example, when one or more of the other users plays the game within the virtual space and successfully completes the game, virtual space component 110 may provide one or more rewards to the user(s) of the game. In some implementations, one or more rewards provided to the user(s) may be taken from the creator of the game (e.g., a winning prize of ten coins may be taken from the creator's account and transferred to the winning user's account, etc.).

Although processor 11, image sensor 12, display 13, and electronic storage 14 are shown to be connected to a bus 15 in FIG. 1, any communication medium may be used to facilitate interaction between any components of system 10. One or more components of system 10 may communicate with each other through hard-wired communication, wireless communication, or both. For example, processor 11 may wirelessly communicate with display 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination.

Processor 11 may be configured to execute one or more of visual information component 102, identification component 104, physical arrangement component 106, virtual space content component 108, virtual space component 110, and/or other components by software; hardware; firmware; some combination of software, hardware, and/or firmware; and/or other mechanisms for configuring processing capabilities on processor 11.

It should be appreciated that although visual information component 102, identification component 104, physical arrangement component 106, virtual space content component 108, and virtual space component 110 are illustrated in FIG. 1 as being co-located within a single processing unit, in implementations in which processor 11 comprises multiple processing units, one or more of visual information component 102, identification component 104, physical arrangement component 106, virtual space content component 108, and/or virtual space component 110 may be located remotely from the other computer program components.

The description of the functionality provided by the different computer program components 102, 104, 106, 108, and/or 110 described herein is for illustrative purposes, and is not intended to be limiting, as any of computer program components 102, 104, 106, 108, and/or 110 may provide more or less functionality than is described. For example, one or more of computer program components 102, 104, 106, 108, and/or 110 may be eliminated, and some or all of its functionality may be provided by other computer program components 102, 104, 106, 108, and/or 110. As another example, processor 11 may be configured to execute one or more additional computer program components that may perform some or all of the functionality attributed to one or more of computer program components 102, 104, 106, 108, and/or 110.

Although image sensor 12 is depicted in FIG. 1 as a single element, this is not intended to be limiting. Image sensor 12 may include one or more image sensors in one or more locations.

Although display 13 is depicted in FIG. 1 as a single element, this is not intended to be limiting. Display 13 may include one or more displays in one or more locations.

The electronic storage media of electronic storage 14 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 14 may be a separate component within system 10, or electronic storage 14 may be provided integrally with one or more other components of system 10 (e.g., processor 11). Although electronic storage 14 is shown in FIG. 1 as a single entity, this is for illustrative purposes only. In some implementations, electronic storage 14 may comprise a plurality of storage units. These storage units may be physically located within the same device, or electronic storage 14 may represent storage functionality of a plurality of devices operating in coordination.

Figure 2:
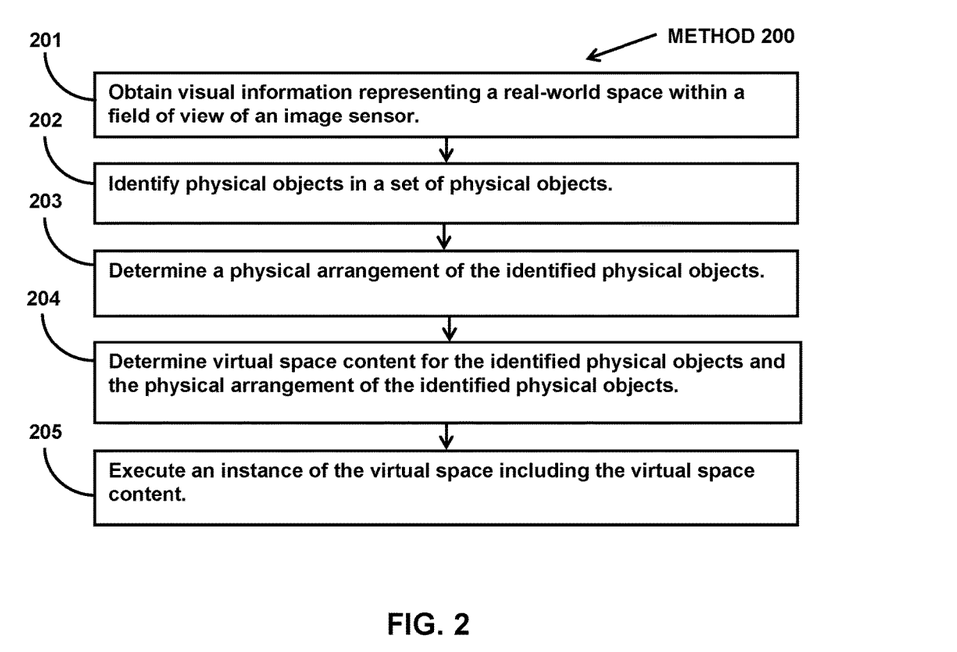
FIG. 2 illustrates a method for providing augmented reality experience based on a relative position of objects.

FIG. 2 illustrate method 200 for providing augmented reality experience based on a relative position of objects. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, visual information representing a real-world space may be obtained. A real-world space may include a set of physical objects and/or other objects. A set of physical objects may include a first physical object, a second physical object, and/or other physical objects that are separate, discrete, and/or unattached from each other. Visual information may represent a real-world space within a field of view of an image sensor. Visual information may include one or more of an image, a video, and/or other visual information. In some implementations, operation 201 may be performed by a processor component the same as or similar to visual information component 102 (shown in FIG. 1 and described herein).

At operation 202, physical objects in a set of physical objects may be identified. Individual ones of the physical objects may be identified from the visual information. In some implementations, the identification of individual ones of the physical objects in the set of physical objects may include determining one or more of shapes of the physical objects, shapes of parts of the physical objects, images on the physical objects, markings on the physical objects, indicia on the physical objects, and/or other identifying features on the physical objects. In some implementations, operation 202 may be performed by a processor component the same as or similar to identification component 104 (shown in FIG. 1 and described herein).

At operation 203, a physical arrangement of the identified physical objects may be determined. The physical arrangement of the identified physical objects may be determined from the visual information. In some implementations, the physical arrangement of the identified physical objects may include relative positions and/or orientations of the identified physical objects. In some implementations, operation 203 may be performed by a processor component the same as or similar to physical arrangement component 106 (shown in FIG. 1 and described herein).

At operation 204, virtual space content may be determined for the identified physical objects and the physical arrangement of the identified physical objects. Such determination may be based on the individual virtual space content associated with the individual identified physical objects and the physical arrangement of the identified physical objects. In some implementations, operation 204 may be performed by a processor component the same as or similar to virtual space content component 108 (shown in FIG. 1 and described herein).

At operation 205, an instance of the virtual space including the virtual space content may be executed. The virtual space may include one or more of a two-dimensional space, a three-dimensional space, and/or other virtual space. The instance of the virtual space may include the virtual space content determined based on the individual virtual space content associated with the individual identified physical objects and the physical arrangement of the identified physical objects, and/or other information. In some implementations, operation 205 may be performed by a processor component the same as or similar to virtual space component 110 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating a virtual space based on a physical layout of objects, the system comprising:
  one or more physical processors configured by machine readable instructions to:
    obtain visual information that represents a real-world space within a field-of-view of an image sensor, the real-world space including a set of physical objects, the set of physical objects including a first physical object and a second physical object that are separate, discrete, and unattached from each other, the first physical object being associated with first virtual space content and the second physical object being associated with second virtual space content;
    identify, from the visual information, individual ones of the physical objects in the set of physical objects;
    determine, from the visual information, a physical arrangement of the identified physical objects, including determining a first physical arrangement of the first physical object and the second physical object;
    determine virtual space content for the identified physical objects and the physical arrangement of the identified physical objects, such determination being based on individual virtual space content associated with the individual identified physical objects and the physical arrangement of the identified physical objects so that the virtual space content for the identified physical objects and the physical arrangement of the identified physical objects is determined based on the first virtual space content, the second virtual space content and the first physical arrangement of the first physical object and the second physical object; and
    execute an instance of the virtual space including the virtual space content determined based on the individual virtual space content associated with the individual identified physical objects and the physical arrangement of the identified physical objects, and use the instance of the virtual space to facilitate presentation of a view of the virtual space to a user and enable the user to interact with the virtual space;
  wherein:
    the first virtual space content includes a first virtual object, and the second virtual space content includes a first game mechanic, the first game mechanic including one or more of a game rule, a goal, a game reward, a victory condition, a defeat condition, or an effects multiplier; and
    the virtual space content included in the instance of the virtual space includes the first game mechanic applied to the first virtual object based on the first physical arrangement of the first physical object and the second physical object.

2. The system of claim 1, wherein the physical arrangement of the identified physical objects includes relative positions and/or orientations of the identified physical objects, and the first physical arrangement of the first physical object and the second physical object includes a relative position and/or orientation of the first physical object and the second physical object.

3. The system of claim 1, wherein:
  the second virtual space content further includes a second virtual object; and
  the virtual space content included in the instance of the virtual space further includes the second virtual object positioned within the virtual space based on the first physical arrangement of the first physical object and the second physical object.

4. The system of claim 1, wherein:
  a combination of the first physical object and the second virtual object and the first physical arrangement of first physical object and the second virtual object is associated with third virtual space content; and
  the virtual space content included in the instance of the virtual space includes the third virtual space content.

5. The system of claim 1, wherein the execution of the instance of the virtual space includes executing an instance of a game within the virtual space, the game being defined at least in part by the first game mechanic, and wherein the one or more physical processors are further configured by machine readable instructions to:
  determine whether the user successfully completes the game; and
  provide a reward based on whether the user successfully completes the game.

6. The system of claim 1, wherein the first physical object includes a card.

7. The system of claim 1, wherein the visual information is conveyed in visual output signals generated by an image sensor of a mobile device.

8. The system of claim 7, wherein the views of the virtual space are presented in a display of the mobile device.

9. The system of claim 7, wherein the views of the virtual space are presented in a display of a computing device that is separate and distinct from the mobile device.

10. The system of claim 1, wherein the association between the first physical object with the first virtual space content is changeable such that the first physical object is alternatively associated with third virtual space content and not the first virtual space content.

11. A method to generate a virtual space based on a physical layout of objects, the method comprising:
  obtaining visual information that represents a real-world space within a field-of-view of an image sensor, the real-world space including a set of physical objects, the set of physical objects including a first physical object and a second physical object that are separate, discrete, and unattached from each other, the first physical object being associated with first virtual space content and the second physical object being associated with second virtual space content;
  identifying, from the visual information, individual ones of the physical objects in the set of physical objects;
  determining, from the visual information, a physical arrangement of the identified physical objects, including determining a first physical arrangement of the first physical object and the second physical object;
  determining virtual space content for the identified physical objects and the physical arrangement of the identified physical objects, such determination being based on individual virtual space content associated with the individual identified physical objects and the physical arrangement of the identified physical objects so that the virtual space content for the identified physical objects and the physical arrangement of the identified physical objects is determined based on the first virtual space content, the second virtual space content and the first physical arrangement of the first physical object and the second physical object; and executing an instance of the virtual space including the virtual space content determined based on the individual virtual space content associated with the individual identified physical objects and the physical arrangement of the identified physical objects, and using the instance of the virtual space to facilitate presentation of a view of the virtual space to a user and enable the user to interact with the virtual space;

wherein:
the first virtual space content includes a first virtual object, and the second virtual space content includes a first game mechanic, the first game mechanic including one or more of a game rule, a goal, a game reward, a victory condition, a defeat condition, or an effects multiplier; and
the virtual space content included in the instance of the virtual space includes the first game mechanic applied to the first virtual object based on the first physical arrangement of the first physical object and the second physical object.

12. The method of claim 11, wherein the physical arrangement of the identified physical objects includes relative positions and/or orientations of the identified physical objects, and the first physical arrangement of the first physical object and the second physical object includes a relative position and/or orientation of the first physical object and the second physical object.

13. The method of claim 11, wherein:
the second virtual space content further includes a second virtual object; and
the virtual space content included in the instance of the virtual space includes the second virtual object positioned within the virtual space based on the first physical arrangement of the first physical object and the second physical object.

14. The method of claim 11, wherein:
a combination of the first physical object and the second virtual object and the first physical arrangement of first physical object and the second virtual object is associated with third virtual space content; and
the virtual space content included in the instance of the virtual space includes the third virtual space content.

15. The method of claim 11, wherein the execution of the instance of the virtual space includes executing an instance of a game within the virtual space, the game being defined at least in part by the first game mechanic, and further comprising:
determining whether the user successfully completes the game; and
providing a reward based on whether the user successfully completes the game.

16. The method of claim 11, wherein the first physical object includes a card.

17. The method of claim 11, wherein the visual information is conveyed in visual output signals generated by an image sensor of a mobile device.

18. The method of claim 17, wherein the views of the virtual space are presented in a display of the mobile device.

19. The method of claim 17, wherein the views of the virtual space are presented in a display of a computing device that is separate and distinct from the mobile device.

20. The method of claim 11, wherein the association between the first physical object with the first virtual space content is changeable such that the first physical object is alternatively associated with third virtual space content and not the first virtual space content.

* * * * *